(12) United States Patent
Smith et al.

(10) Patent No.: US 7,185,993 B2
(45) Date of Patent: Mar. 6, 2007

(54) FLEXIBLE CUBE-CORNER RETROFLECTIVE SHEETING

(75) Inventors: Kenneth L. Smith, White Bear Lake, MN (US); Tzu-Li J. Huang, Woodbury, MN (US); James C. Coderre, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 369 days.

(21) Appl. No.: 10/039,103

(22) Filed: Jan. 4, 2002

(65) Prior Publication Data

US 2002/0126382 A1 Sep. 12, 2002

Related U.S. Application Data

(63) Continuation of application No. 08/516,018, filed on Aug. 16, 1995, now Pat. No. 6,350,035, which is a continuation of application No. 08/139,433, filed on Oct. 20, 1993, now Pat. No. 5,450,235.

(51) Int. Cl.
*G02B 5/124* (2006.01)
*B32B 18/00* (2006.01)

(52) U.S. Cl. .................................. 359/530; 428/325

(58) Field of Classification Search ................ 359/529, 359/530; 428/156, 286, 412
See application file for complete search history.

(56) References Cited

U.S. PATENT DOCUMENTS

| | | | |
|---|---|---|---|
| 3,190,178 A | 6/1965 | McKenzie | |
| 3,450,459 A | 6/1969 | Haggerty | |
| 3,632,695 A | 1/1972 | Howell | |
| 3,684,348 A | 8/1972 | Rowland | |
| 3,689,346 A | 9/1972 | Rowland | |
| 3,700,305 A | 10/1972 | Bingham | |
| 3,712,706 A | 1/1973 | Stamm | |
| 3,810,804 A | 5/1974 | Rowland | |
| 3,811,983 A | 5/1974 | Rowland | |
| 3,830,682 A | 8/1974 | Rowland | |
| 3,924,929 A | 12/1975 | Holmen et al. | |
| 3,926,402 A | 12/1975 | Heenan et al. | |

(Continued)

FOREIGN PATENT DOCUMENTS

DE P 23 17 871.4 10/1974

(Continued)

OTHER PUBLICATIONS

D.A.T.A. Business Publishing, *Plastics Digest*, IPS, 1995, Edition 16, vol. 1, pp. 1-298 to 1-300, no month.

(Continued)

*Primary Examiner*—James Phan
(74) *Attorney, Agent, or Firm*—Jay R. Pralle (57) ABSTRACT

A retroreflective article 10 has a body portion 14 and a multitude of cube-corner elements 12 that project from a rear side 20 of the body portion 14. The body portion 14 includes a body layer 18 that contains a light-transmissible polymeric material having an elastic modulus less than $7 \times 10^8$ pascals. The cube-corner elements 12 contain a light transmissible polymeric material having an elastic modulus greater than $16 \times 10^8$ pascals. A retroreflective article of this construction can be highly flexed while maintaining good retroreflective performance.

1 Claim, 1 Drawing Sheet

U.S. PATENT DOCUMENTS

| | | |
|---|---|---|
| 3,935,359 A | 1/1976 | Rowland |
| 3,992,080 A | 11/1976 | Rowland |
| 4,025,159 A | 5/1977 | McGrath |
| 4,202,600 A | 5/1980 | Burke et al. |
| 4,243,618 A | 1/1981 | Van Arnam |
| 4,332,847 A | 6/1982 | Rowland |
| 4,349,598 A | 9/1982 | White |
| 4,414,316 A | 11/1983 | Conley |
| 4,486,363 A | 12/1984 | Pricone et al. |
| 4,555,161 A | 11/1985 | Rowland |
| 4,576,850 A | 3/1986 | Martens |
| 4,582,885 A | 4/1986 | Barber |
| 4,588,258 A | 5/1986 | Hoopman |
| 4,601,861 A | 7/1986 | Pricone et al. |
| 4,668,558 A | 5/1987 | Barber |
| 4,775,219 A | 10/1988 | Appeldorn et al. |
| 4,801,193 A | 1/1989 | Martin |
| 4,895,428 A | 1/1990 | Nelson et al. |
| 4,938,563 A | 7/1990 | Nelson et al. |
| 5,066,098 A | 11/1991 | Kult et al. |
| 5,077,117 A | 12/1991 | Harper et al. |
| 5,117,304 A | 5/1992 | Huang et al. |
| 5,138,488 A | 8/1992 | Szczech |
| 5,175,030 A | 12/1992 | Lu et al. |
| 5,183,597 A | 2/1993 | Lu |
| 5,189,553 A | 2/1993 | Smith |
| 5,213,872 A | 5/1993 | Pricone et al. |
| 5,229,882 A | 7/1993 | Rowland |
| 5,236,751 A | 8/1993 | Martin et al. |
| 5,264,063 A | 11/1993 | Martin |
| 5,272,562 A | 12/1993 | Coderre |
| 5,376,431 A | 12/1994 | Rowland |
| 5,450,235 A | 9/1995 | Smith et al. |
| 5,491,586 A | 2/1996 | Phillips |
| 5,585,164 A | 12/1996 | Smith et al. |
| 5,600,484 A | 2/1997 | Benson et al. |
| 5,614,286 A | 3/1997 | Bacon, Jr. et al. |
| 5,642,222 A | 6/1997 | Phillips |
| 5,691,846 A | 11/1997 | Benson, Jr. et al. |
| 5,988,820 A | 11/1999 | Huang et al. |
| 6,350,035 B1 * | 2/2002 | Smith et al. ................. 359/530 |

FOREIGN PATENT DOCUMENTS

| | | |
|---|---|---|
| EP | 0 175 031 A1 | 3/1986 |
| EP | 0 200 521 | 11/1986 |
| EP | 0 382 240 A2 | 8/1990 |
| EP | 0 478 178 A1 | 4/1992 |
| GB | 2 245 219 A | 1/1992 |
| WO | WO92/04647 | 3/1992 |
| WO | WO94/19711 | 9/1994 |
| WO | WO95/03558 | 2/1995 |
| WO | WO95/07179 | 3/1995 |
| WO | WO95/11466 | 4/1995 |

OTHER PUBLICATIONS

Priola, a., et al., *Proceedings of the XIII International Conference in Organic Coatings Science and Technology*, Athens, Greece, Jul. 7-11, 1987, pp. 308-318.

Leighton, J., et al., *RF Welding and PVC and Other Thermoplastic Compounds*, ANTEC, 1992, pp. 724-728, no month.

Technical Report No. 9077 of Reflexite Retroreflective Sheeting Product, no date.

Technical Report No. 9078 of Reflexite Super Bright Brand Reflective Fabric, no date.

Yoder, P.R. Jr., *Study of Light Deviation Errors in Triple Mirrors and Tetrahedral Prisms*, J. Optical Soc. of America, vol. 48, No. 7, Jul. 1959, pp. 496, 499.

"Reflexite's Response to 3M Letter Asserting Infringement of U.S. Patents 5,450,235 and 5,988,820" (pertinent portions), Feb. 4, 2002.

* cited by examiner

FLEXIBLE CUBE-CORNER RETROFLECTIVE SHEETING

This application is a continuation of U.S. application Ser. No. 08/516,018, filed Aug. 16, 1995, now U.S. Pat. No. 6,350,035 which is a continuation of U.S. application Ser. No. 08/139,433, filed Oct. 20, 1993, issued as U.S. Pat. No. 5,450,235.

TECHNICAL FIELD

This invention pertains to a flexible cube-corner retroreflective sheeting, and more particularly to a flexible cube-corner retroreflective sheeting that uses a high elastic modulus polymer in the cube-corner elements and a low elastic modulus polymer in the body portion.

BACKGROUND OF THE INVENTION

Retroreflective sheetings have the ability to redirect incident light towards its originating source. This unique ability has led to the wide-spread use of retroreflective sheetings on a variety of articles. Very often the retroreflective sheetings are used on flat inflexible articles, for example, road signs and barricades—however, situations frequently arise which require the sheetings to be used on irregular or flexible surfaces. For example, a retroreflective sheeting may be adhered to the side of a truck trailer, which requires the sheeting to pass over corrugations and protruding rivets, or the sheeting may be adhered to a flexible substrate such as a road worker's safety vest. In situations where the underlying surface is irregular or flexible, the retroreflective sheeting desirably possesses good conformability and flexibility but not at the expense of sacrificing retroreflective performance.

There are essentially two types of retroreflective sheeting: beaded sheeting and cube-corner sheeting. Beaded sheeting employs a multitude of glass or ceramic microspheres to retroreflect incident light. The microspheres are separate from each other and therefore do not severely impose on the sheeting's ability to be flexed. Cube-corner sheeting, on the other hand, typically employs a multitude of rigid, interconnected, cube-corner elements to retroreflect incident light. Due in part to its interconnected structure, the shape of the sheeting's cube-corner elements can become distorted during flexing, resulting in a loss of retroreflectivity. The construction of cube-corner sheeting, therefore, places limits on the degree to which the sheeting can be conformed or flexed and still maintain satisfactory retroreflectivity. In the attempt to expand or remove these limits, investigators have taken many different approaches to produce a cube-corner sheeting that demonstrates good retroreflectivity after being flexed or conformed. Examples of these different approaches have been disclosed in U.S. Pat. Nos. 3,684,348, 3,924,929, 3,992,080, 4,555,161, 4,576,850, 4,668,558, 4,582,885, 5,177,304, 5,189,553 and U.K. Patent GB 2,245,219 A.

In U.S. Pat. No. 3,684,348 a retroreflective sheeting is disclosed that has a multitude of cube-corner formations projecting from a body portion. The cube-corner formations and the body portion are separately formed from essentially transparent synthetic plastic resin and are bonded together as a composite structure. To facilitate mounting on and shaping to surfaces of various configurations, it is disclosed that the body portion can be flexible.

U.S. Pat. No. 3,924,929 discloses a cube-corner retroflective sheeting that contains a multiplicity of trihedral prismatic retroreflective units separated into cells by interconnected septa. A multiplicity of retroreflective sheeting units may be bonded to a flexible backing such as a polyester or polyvinylchloride web. The retroreflective sheeting units are positioned on the backing in a manner that allows the flexible article to be rolled or folded in either direction along two adjacent edges.

U.S. Pat. No. 3,992,080 discloses a retroreflective sheeting that provides good retroreflection when stretched. The sheeting comprises a first strip of transparent flexible synthetic resin having a multiplicity of minute cube-corner formations on one surface thereof. The cube-corner formations are bonded to a second strip of flexible backing material of lesser length than the first strip when in a relaxed condition. The first strip is bonded to the second strip with the cube-corner formations disposed adjacent to the second strip. This composite retroreflective sheet material is puckered in the relaxed state and is stretchable on a support surface with the elimination of the puckered condition. It is disclosed that this construction allows the sheeting to be stretched while avoiding distortion of the cube-corner formations.

U.S. Pat. No. 4,555,161 discloses a retroreflective sheeting that provides a high degree of flexibility to permit the sheeting to be tailored to a wide range of applications. The retroreflective sheeting comprises a base sheet that includes a flexible synthetic plastic sheet material; a cover sheet that includes a coextensive length of flexible transparent synthetic plastic; and a multiplicity of retroreflective film pieces disposed between the base sheet and the cover sheet. The film pieces are arranged as an array in a predetermined pattern, and the sheets are bonded to one another in areas between and about the film pieces to provide a multiplicity of discrete cells in which the film pieces are seated. A portion of each of the film pieces defines a multiplicity of minor cube-corner formations that provide the retroreflective properties to the sheeting.

U.S. Pat. Nos. 4,576,850, 4,582,885, and 4,668,558 disclose a retroreflective cube-corner sheeting that possesses good flexibility and dimensional stability. The retroreflective sheeting is made from a cross-linked polymer composed of (1) a plurality of hard segments of mono- or polyvalent moieties containing one or more carbocyclic and/or heterocyclic groups and (2) a plurality of soft segments of mono- or polyvalent moieties. The moieties of the hard segments have a major transition temperature above 250° K, and the moieties of the soft segments have a glass transition temperature below 250° K and have an average molecular weight of about 500 to 5,000.

U.S. Pat. No. 5,117,304 discloses a flexible retroreflective sheeting based upon an optically clear, aliphatic polyurethane polymer. The retroreflective sheeting comprises a land and an array of elements on the land. The flexibility is imparted to the sheeting by use of an aliphatic polyurethane polymer in the retroreflective elements which has a plurality of hard chain segments of the formula U.S. Pat. No. 5,189,553 discloses retroreflective cube-corner sheeting that is suitable for bending applications. The sheet has an outer surface that is designed for tension during sheet bending and an inner surface design for compression during sheet bending. A sheet neutral bending access region is located relative to the outer and inner surfaces so that a neutral bending access exists, which is substantially free of stress and deformation during sheet bending. The sheet also has a plurality of reflective cube-corner elements with surfaces purposefully located proximate to the neutral bending access. It is disclosed that this sheeting provides enhanced retroreflective performance for a given radius of curvature.

U.K. Patent Application GB 2,245,219 A discloses a flexible retroreflective sheet material comprising relatively flexible body member of a transparent synthetic resin. The flexible body member has first and second faces, where the first face is planar, and the second face has closely-spaced retroreflective microprisms located thereover. The body member has a thickness from the first face to the base of the microspheres of 5.08 to 25.4 micrometers. The microprisms have a height of 25.4 to 254 micrometers. An adhesive coating is disposed on the second face over some of the microprisms, and a flexible backing member extends over the second face and is bonded to the microprisms by the adhesive coating.

Although the above-discussed patents disclose a variety of different constructions for providing flexible, retroreflective, cube-corner sheeting, some of the disclosed constructions are relatively complicated in construction. Others, while being no more complicated than a typical retroreflective sheeting, use relatively expensive polymeric materials or provide limited retroreflectance when highly flexed or conformed, or simply fail to fully teach how good retroreflectivity is achieved after the sheeting has been flexed or conformed.

SUMMARY OF THE INVENTION

The present invention provides a new approach to producing a flexible cube-corner retroreflective sheeting. The sheeting of this invention is relatively simple in construction when compared to some of the prior art flexible cube-corner retroreflective sheetings, and it can be extraordinarily flexed and conformed while maintaining a high degree of retroreflectance. The sheeting also can be made from relatively inexpensive polymers. In brief summary, the cube-corner retroreflective sheeting of this invention comprises: (a)

a body portion that has first and second major surfaces and that includes a body layer of polymeric material that has an elastic modulus less than $7 \times 10^8$ pascals, the body layer allowing light that enters the body portion through either the first or the second major surfaces to pass through the body layer to exit the body portion through the other major surface; and (b) cube-corner elements that project from the second major surface of the body portion such that light that exits the body portion through the second major surface enters the cube-corner elements where it is reflected to reenter the body portion, the cube-corner elements containing a polymeric material that has an elastic modulus greater than the body layer to such an extent that the retroreflective sheeting does not exhibit a substantial loss of retroreflectivity when flexed.

The present invention differs from known cube-corner retroreflective sheetings in that the body layer is made from a low elastic modulus polymeric material, and the cube-corner elements are made from a higher elastic modulus polymeric material. The term "elastic modulus" means the elastic modulus determined according to ASTM D 882-75b using Static Weighing Method A with a five inch initial grip separation, a one inch sample width, and an inch per minute rate of grip separation.

As indicated above, retroreflective sheetings that employ different polymers in the cubes and body portion of the sheeting are known, see, for example, U.S. Pat. No. 5,117, 304 and U.S. Pat. No. 3,684,348. It is believed, however, that no document discloses the combination of higher elastic modulus cubes and a low elastic modulus body layer. This combination is very advantageous because the sheeting can be highly flexed without suffering from a substantial loss of retroreflectivity. The flexibility demonstrated by sheetings of the invention is great enough to allow the sheeting to be adhered to a highly conformed surface (for example, over a protruding rivet) by use of a conventional pressure sensitive adhesive. The cube-corner elements demonstrate extraordinary dimensional stability during flexing and thereby provide good retroreflective performance when conformed. The dimensional stability and good retroreflective performance can be maintained at high temperatures.

The above and other advantages of the invention are more fully shown and described in the drawings and detailed description of this invention, where like reference numerals are used to represent similar parts. It is to be understood, however, that the description and drawings are for the purposes of illustration only and should not be read in a manner that would unduly limit the scope of this invention.

BRIEF DESCRIPTION OF THE DR WINGS

DETAILED DESCRIPTION OF PREFERRED EMBODIMENTS

In describing preferred embodiments of the invention, specific terminology will be used for the sake of clarity. The invention, however, is not intended to be limited to the specific terms so selected, and it is to be understood that each term so selected includes all technical equivalents that operate similarly.

Figure 1:
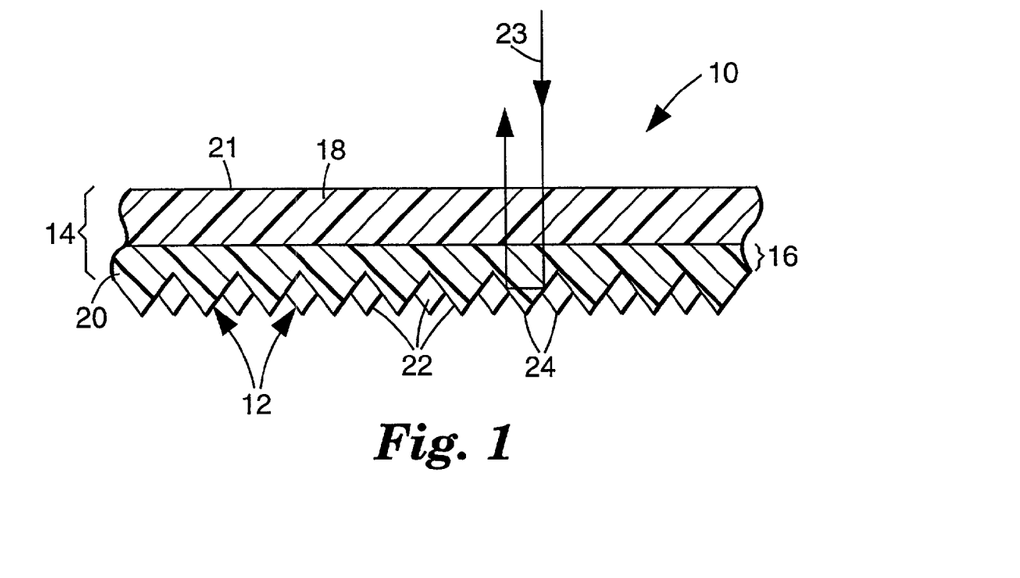
FIG. 1 is a cross-sectional view of a cube-corner retroreflective sheeting 10 in accordance with the present invention.

In the practice of the present invention, a cube-corner retroreflective sheeting is provided that maintains good dimensional stability and high degrees of retroreflectance under highly flexed conditions. FIG. 1 illustrates an example of a cube-corner retroreflective sheeting 10 of the present invention. Cube-corner retroreflective sheeting 10 comprises a multitude of cube-corner elements 12 and a body portion 14. The body portion 14 can include a land layer 16 and a body layer 18. The body layer typically functions to protect the sheeting from environmental elements and/or to provide significant mechanical integrity to the sheeting. In a preferred embodiment, the body layer 18 is the outermost layer on the front side of the sheeting 10. The land layer 16 is distinguished from the body layer 18 by being a layer disposed immediately adjacent to the base of the cube-corner elements, and the term "land layer" is used herein to mean such a layer.

The cube-corner elements 12 project from a first or rear side 20 of body portion 14. The cube-comer elements 12 comprise a light transmissible polymeric material having an elastic modulus greater than $16 \times 10^8$ pascals, preferably greater than $18 \times 10^8$, and more preferably greater than $20 \times 10^8$ pascals, and the body layer 18 comprises a light transmissible polymeric material having an elastic modulus less than $7 \times 10^8$ pascals, preferably less than $5 \times 10^8$ pascals, and more preferably less than $3 \times 10^8$ pascals.

Thus, the cube-corner elements 12 contain a polymeric material that has an elastic modulus that is at least $9 \times 10^8$ pascals greater than the polymeric material of the body layer, and may be $11 \times 10^8$, $13 \times 10^8$, or even $17 \times 10^8$ pascals greater than the body layer's polymeric material. Light enters the cube-corner sheeting 10 through the front surface 21. The light then passes through the body portion 14 and strikes the planar faces 22 of the cube-corner elements 12 and returns in the direction from which it came as shown by arrow 23.

In a preferred construction, the cube-corner elements 12 and land layer 16 are made from similar or the same kind of polymers, and the land layer 16 is kept to a minimal thickness. The land layer 16, typically, has a thickness in the range of about 0 to 150 micrometers, and preferably in the range of approximately about 1 to 100 micrometers. Body layer 18 typically has a thickness of approximately 20 to 1,000 micrometers, and preferably in the range of about 50 to 250 micrometers. Although it is preferred to keep the land layer to a minimum thickness, it is desired that the sheeting 10 possess some land layer 16 so that a flat interface can be provided between the land layer 16 and the body layer 18. The cube-corner elements 12 typically have a height in the range of about 20 to 500 micrometers, and more typically in the range of about 60 to 180 micrometers. Although the embodiment of the invention shown in FIG. 1 has a single body layer 18, it is within the scope of the present invention to provide more than one body layer 18 in the body portion 14.

Figure 2:
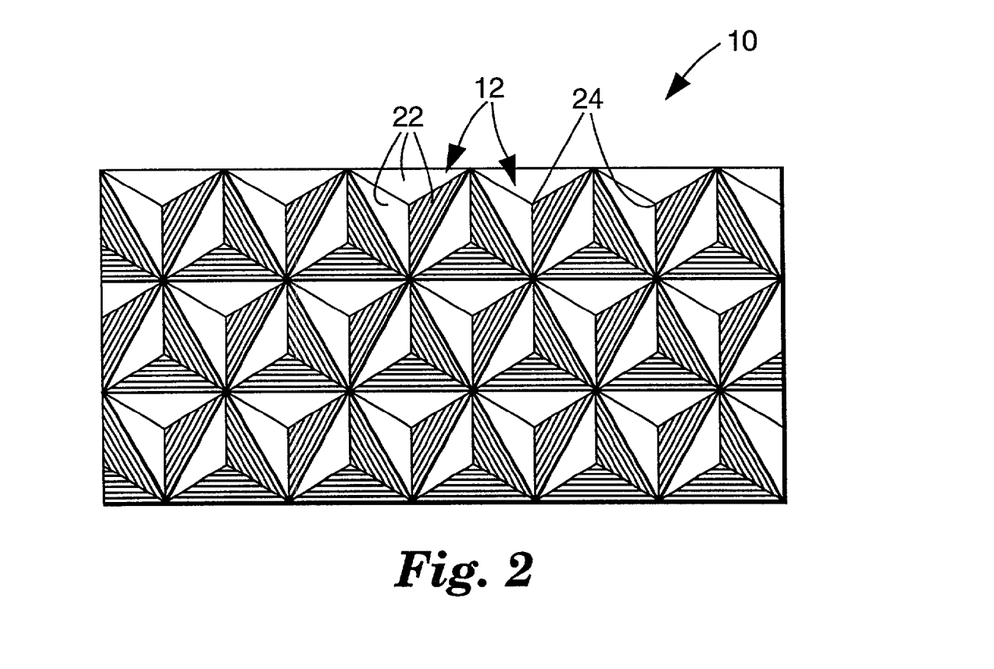
FIG. 2 is a view of the backside of the cube-corner retroreflective sheeting 10 of FIG. 1.

FIG. 2 illustrates the back side of the cube-corner elements 12. As shown, the cube-corner elements 12 are disposed as matched pairs in an array on one side of the sheeting. Each cube-corner element 12 has the shape of a trihedral prism with three exposed planar faces 22. The planar faces 22 may be substantially perpendicular to one another (as in the corner of a room) with the apex 24 of the prism vertically aligned with the center of the base. The angle between the faces 22 typically is the same for each cube-corner element in the array and will be about 90°. The angle, however, can deviate from 90° as is well-known; see, for example, U.S. Pat. No. 4,775,219 to Appledorn et al. Although the apex 24 of each cube-corner element 12 may be vertically aligned with the center of the base of the cube-corner element, see, for example, U.S. Pat. No. 3,684,348. The apex also may be canted to the center of the base as disclosed in U.S. Pat. No. 4,588,258. Thus, the present invention is not limited to any particular cube-corner geometry; however, of the many known cube-corner configurations, see, for example, U.S. Pat. Nos. 4,938,563, 4,775,219, 4,243,618, 4,202,600, and 3,712,706, the cube-corner sheeting described in U.S. Pat. No. 4,588,258 may be preferred because it provides wide angle retroreflection among multiple viewing planes.

A specular reflective coating such as a metallic coating (not shown) can be placed on the backside of the cube-corner elements 12 to promote retroreflection. The metallic coating can be applied by known techniques such as vapor depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. Nos. 4,025,159 and 5,117,304. The sealing film maintains an air interface at the backside of the cubes to enhance retroreflectivity. A backing or an adhesive layer also can be disposed behind the cube-corner elements to enable the cube-corner retroreflective sheeting 10 to be secured to a substrate.

The polymeric materials that compose the retroreflective sheeting of the invention are light transmissible. This means that the polymer is able to transmit at least 70 percent of the intensity of the light incident upon it at a given wavelength. More preferably, the polymers that are used in the retroreflective sheeting of the invention have a light transmissibility of greater than 80 percent, and more preferably greater than 90 percent.

The polymeric materials that are employed in the cube-corner elements tend to be hard and rigid. The polymeric materials may be thermoplastic or crosslinkable resins. The elastic modulus of these polymers preferably is greater than $18 \times 10^8$ pascals, and more preferably is greater than $20 \times 10^8$ pascals.

When thermoplastic polymers are used in the cubes, the glass transition temperature generally is greater than 80° C., and the softening temperature is typically greater than 150° C. Generally, the thermoplastic polymers used in the cube-corner layer are amorphous or semi-crystalline, and the linear mold shrinkage of the polymer generally is less than one percent.

Examples of thermoplastic polymers that may be used in the cube-corner elements include acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

Additional materials suitable for forming the cube-corner elements are reactive resin systems capable of being crosslinked by a free radical polymerization mechanism by exposure to actinic radiation. for example, electron beam, ultraviolet light, or visible light. Additionally, these materials may be polymerized by thermal means with the addition of a thermal initiator such as benzoyl peroxide. Radiation-initiated cationically polymerizable resins also may be used.

Reactive resins suitable for forming the cube-corner elements may be blends of photoiniator and at least one compound bearing an acrylate group. Preferably the resin blend contains a difunctional or polyfunctional compound to ensure formation of a crosslinked polymeric network upon irradiation.

Examples of resins that are capable of being polymerized by a free radical mechanism include acrylic-based resins derived from epoxies, polyesters, polyethers and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof The term acrylate is used here to encompass both acrylates and methacrylates. U.S. Pat. No. 4,576,850 to Martens (disclosure incorporated here by reference) discloses examples of crosslinked resins that may be used in the cube-corner elements of the present invention.

Ethylenically unsaturated resins include both monomeric and polymeric compounds that contain atoms of carbon, hydrogen and oxygen, and optionally nitrogen, sulfur and the halogens. Oxygen or nitrogen atoms or both are generally present in ether, ester, urethane, amide and urea groups. Ethylenically unsaturated compounds preferably have a molecular weight of less than about 4,000 and preferably are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Some examples of compounds having an acrylic or methacrylic group are listed below. The listed compounds are illustrative and not limiting.

(1) Monofunctional compounds:
ethylacrylate, n-butylacrylate, isobutylacrylate, 2-ethylhexylacrylate, n-hexylacrylate, n-octylacrylate, isobornyl acrylate, tetrahydrofurfuryl acrylate, 2-phenoxyethyl acrylate, N,N-dimethylacrylamide;

(2) Difunctional compounds:
1,4-butanediol diacrylate, 1,6-hexanediol diacrylate, neopentylglycol diacrylate, ethylene glycol diacrylate, triethyleneglycol diacrylate, and tetraethylene glycol diacrylate;

(3) Polyfunctional compounds:
trimethylolpropane triacrylate, glyceroltriacrylate, pentaerythritol triacrylate, pentaerythritol tetraacrylate, and tris(2-acryloyloxyethyl)isocyanurate.

Some representative examples of other ethylenically unsaturated compounds and resins include styrene, divinylbenzene, vinyl toluene, N-vinyl pyrrolidone, N-vinyl caprolactam, monoallyl, polyallyl, and polymethallyl esters such as diallyl phthalate and diallyl adipate, and amides of carboxylic acids such as and N,N-diallyladipamide.

Examples of photopolymerization initiators which can be blended with the acrylic compounds include the following illustrative initiators: benzil, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzil methyl ketal, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)- 1-butanone, 2,4,6-trimethylbenzoyldiphenyl-phosphine oxide, 2-methyl-1-4-(methylthio)phenyl-2-morpholino-1-propanone, et cetera. These compounds may be used individually or in combination.

Cationically polymerizable materials include but are not limited to materials containing epoxy and vinyl ethers functional groups. These systems are photoinitiated by onium salt initiators such as triarylsulfonium, and diaryliodonium salts.

Preferred polymers for the cube-corner elements include poly(carbonate), poly(methylmethacrylate), poly(ethyleneterephthalate), and crosslinked acrylates such as multi-functional acrylates or epoxies and acrylated urethanes blended with mono- and multi-functional monomers. These polymers are preferred for one or more of the following reasons: thermal stability, environmental stability, clarity, excellent release from the tooling or mold, and capable of receiving a reflective coating.

The polymeric materials employed in the land layer, as indicated above, may be the same as the polymers that are employed in the cube-corner elements, provided the land layer is kept to a minimal thickness. The land layer preferably is substantially flat so that a better interface is achieved between the cubes and the body layer. Cavities and/or interfacial roughness preferably are avoided between the cubes and land layer so that optimum brightness can be displayed by the retroreflective sheeting when light is retroreflected therefrom. A good interface prevents spreading of retroreflective light from refraction. In most instances, the land layer is integral with the cube-corner elements. By "integral" is meant the land and cubes are formed from a single polymeric material—not two different polymeric layers subsequently united together. The polymers that are employed in the cube-corner elements and land layer can have refractive indices which are different from the body layer. Although the land layer desirably is made of a polymer similar to that of the cubes, the land also may be made from a softer polymer such as those used in the body layer.

The body layer comprises a low elastic modulus polymer for easy bending, curling, flexing, conforming, or stretching. The elastic modulus preferably is less than $5 \times 10_8$ pascals, and more preferably is less than $3 \times 10^8$ pascals. Generally, the polymers of the body layer have a glass transition temperature that is less than 50° C. The polymer preferably is such that the polymeric material retains its physical integrity at the temperatures at which it is applied to the cubes. The polymer desirably has a vicate softening temperature that is greater than 50° C. The linear mold shrinkage of the polymer desirably is less than 1 percent. Preferred polymeric materials used in the body layer are resistant to degradation by UV light radiation so that the retroreflective sheeting can be used for long-term outdoor applications. Examples of polymers that may be employed in the body layer include:

fluorinated polymers such as: poly(chlorotrifluoroethylene), for example Kel-F800™ available from 3M, St. Paul, Minn.; poly(tetrafluoroethylene-co-hexafluoropropylene), for example Exac FEP™ available from Norton Performance, Brampton, Mass.; poly(tetrafluoroethylene-co-perfluoro(alkyl)vinylether), for example, Exac PEA™ also available from Norton Performance; and poly(vinylidene fluoride-co-hexafluoropropylene), for example, Kynar Flex-2800™ available from Pennwalt Corporation, Philadelphia, Pa.;

ionomeric ethylene copolymers such as: poly(ethylene-co-methacrylic acid) with sodium or zinc ions such as Surlyn-8920™ and Surlyn-9910™ available from E. I. duPont Nemours, Wilmington, Del.;

low density polyethylenes such as: low density polyethylene; linear low density polyethylene; and very low density polyethylene;

plasticized vinyl halide polymers such as plasticized poly(vinylchloride);

polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)$ n- where n is 0–12, and poly(ethylene-co-vinylacetate); and aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether glycol, polyethylene glycol, polycaprolactone diol, poly-1,2-butylene oxide glycol, and combinations of these polydiols, and (3) chain extenders such as butanediol or hexanediol. Commercially available urethane polymers include: PN-04, or 3429 from Morton International Inc., Seabrook, N.H., or X-4107 from B.F. Goodrich Company, Cleveland, Ohio.

Combinations of the above polymers also may be employed in the body layer of the body portion. Preferred polymers for the body layer include: the ethylene copolymers that contain units that contain carboxyl groups or esters of carboxylic acids such as poly(ethylene-co-acrylic acids, poly(ethylene-co-methacrylic acid), poly(ethylene-co-vinylacetate); the ionomeric ethylene copolymers; plasticized poly(vinylchloride); and the aliphatic urethanes. These polymers are preferred for one or more of the following reasons: suitable mechanical properties, good adhesion to the land layer, clarity, and environmental stability.

In an embodiment that contains polycarbonate cube-corner elements and/or a polycarbonate land layer and a body layer that contains a polyethylene copolymer such as poly(ethylene-co-(meth)acrylic acid), poly(ethylene-co-vinylacetate) or poly(ethylene-co-acrylate), the interfacial adhesion between the body layer and the land layer or cube-corner elements can be improved by placing a thin tie-layer (not shown) therebetween. The tie-layer can be applied on the body layer before laminating the body layer to the land layer or to the cube-corner elements. The tie-layer can be applied as a thin coating using, for example: an aliphatic polyurethane in organic solution, for example Permuthane™ U26-248 solution, available from Permuthane Company, Peabody, Mass.; Q-thanem™ QC-4820 available from K. J. Quinn and Co., Inc., Seabrook, N.H.; an aliphatic polyurethane waterborne dispersion, for example NeoRez™ R-940, R-9409, R-960, R-962, R-967, and R-972, available from ICI Resins US, Wilmington, Mass.; an acrylic polymer water borne dispersion, for example, NeoCryl™ A-601, A-612, A-614, A-621, and A-6092, available from ICI Resins US, Wilmington, Mass.; or an alkyl acrylate and aliphatic urethane copolymer water borne dispersion, for example NeoPac™ R-9000, available from ICI Resins US, Wilmington, Mass. In addition, an electrical discharge method, such as a corona or plasma treatment, can be used to further improve the adhesion of tie-layer to the body layer or the tie-layer to the land layer or to the cube-corner elements.

Colorants, UV absorbers, light stabilizers, free radical scavengers or antioxidants, processing aids such as antiblocking agents, releasing agents, lubricants, and other additives may be added to the body portion or cube-corner elements. The particular colorant selected, of course, depends on the desired color of the sheeting. Colorants typically are added at about 0.01 to 0.5 weight percent. UV absorbers typically are added at about 0.5 to 2.0 weight percent. Examples of UV absorbers include derivatives of benzotriazole such as Tinuvin™ 327, 328, 900, 1130, Tinuvin-P™, available from Ciba-Geigy Corporation, Ardsley, N.Y.; chemical derivatives of benzophenone such as Uvinul™-M40, 408, D-50, available from BASF Corporation, Clifton, N.J.; Syntase™ 230, 800, 1200 available from Neville-Synthese Organics, Inc., Pittsburgh, Pa.; or chemical derivatives of diphenylacrylate such as Uvinul™-N35, 539, also available from BASF Corporation of Clifton, N.J. Light stabilizers that may be used include hindered amines, which are typically used at about 0.5 to 2.0 weight percent. Examples of hindered amine light stabilizers include Tinuvin™-144, 292, 622, 770, and Chimassorb™-944 all available from the Ciba-Geigy Corp., Ardsley, N.Y. Free radical scavengers or antioxidants may be used, typically, at about 0.01 to 0.5 weight percent. Suitable antioxidants include hindered phenolic resins such as Irganox™-1010, 1076, 1035, or MD-1024, or Irgafos™-168, available from the Ciba-Geigy Corp., Ardsley, N.Y. Small amount of other processing aids, typically no more than one weight percent of the polymer resins, may be added to improve the resin's processibility. Useful processing aids include fatty acid esters, or fatty acid amides available from Glyco Inc., Norwalk, Conn., metallic stearates available from Henkel Corp., Hoboken, N.J., or Wax E™ available from Hoechst Celanese Corporation, Somerville, N.J.

Cube-corner retroreflective sheetings of the invention can be made by: (a) forming a plurality of cube-corner elements from a light transmissible material having an elastic modulus greater than $16 \times 10^8$ pascals; and (b) securing a body layer to the plurality of cube-corner elements, wherein the body layer includes a light transmissible material having an elastic modulus less than $7 \times 10^8$ pascals. Steps (a) and (b) can be carried out according to a variety of known (or later discovered) methods for making cube-corner sheeting, see, for example, U.S. Pat. Nos. 3,689,346, 3,811,983, 4,332, 847, and 4,601,861, with the exception of using a high elastic modulus polymer to form the cube-corner elements and a low elastic modulus polymer to form the body layer. The body layer may be secured directly to the base of the cube-corner elements, or it may be secured to the cube-corner elements by a land layer. As indicated above, the land layer preferably is kept to a minimal thickness and preferably is made from a high elastic modulus material.

Features and advantages of this invention are further illustrated in the following examples. It is to be expressly understood, however, that while the examples serve this purpose, the particular ingredients and amounts used as well as other conditions and details are not to be construed in a manner that would unduly limit the scope of this invention.

EXAMPLES

Example 1 (Comparative)

Molten polycarbonate resin (Makrolon™ 2407, supplied by Mobay Corporation, Pittsburgh, Pa.) was cast onto a heated microstructured nickel tooling containing microcube prism recesses having a depth of approximately 86 micrometers (0.0034 inch). The microcube recesses were formed as matched pairs of cube-corner elements with the optical axis canted or tilted 4.31 degrees away from the primary groove, as generally illustrated in U.S. Pat. No. 5,138,488 to Szczech. The nickel tooling thickness was 508 micrometers (0.020 inch), and the tooling was heated to 215.6° C. (420° F.). Molten polycarbonate at a temperature 287.8° C. (550° F.) was cast onto the tooling at a pressure of approximately $1.03 \times 10^7$ to $1.38 \times 10^7$ pascals (1500 to 2000 psi) for 0.7 seconds in order to replicate the microcube recesses. Coincident with filling the cube recesses, additional polycarbonate was deposited in a continuous land layer above the tooling with a thickness of approximately 51 micrometers (0.002 inch). A previously extruded 43 micrometer (0.0017 inch) thick impact modified, continuous, poly(methylmethacrylate) body layer film (Plexiglass 60% VO-45 and 40% DR-1000, material supplied by Rohm and Haas Company, Philadelphia, Pa.) was then laminated onto the top surface of the continuous polycarbonate land layer when the surface temperature was approximately 190.6° C. (375° F.). The combined tooling with laminated poly(carbonate) and poly(methylmethacrylate) body layer was then cooled with room temperature air for 18 seconds to a temperature of 71.1–87.8 C (160–190 F), allowing the laminate materials to solidify. The laminate sample was then removed from the microstructured tool.

Example 2

A second sample was produced by the procedure outlined in Example 1, except the body layer was a previously extruded 79 micrometer (0.0031 inch) thick, continuous, poly(ethylene-co-acrylic acid) film (Primacor™ 3440, material supplied by The Dow Chemical Company, Midland, Mich.). An aliphatic polyester urethane primer was applied to promote adhesion of this film to the poly(carbonate) surface. The primer (Q-Thane™ QC-4820, supplied by K. J. Quinn and Co., Inc., Seabrook, N.H., was solvent coated to form a layer having a final dried thickness of approximately 2.5 micrometers (0.0001 inch).

Example 3

A third sample was produced by the procedure outlined in Example 1, except the body layer was a previously extruded 71 micrometer (0.0028 inch) thick aliphatic polyester urethane body layer (Morthane™ PNO3, supplied by Morton International, Seabrook, N.H.).

Table 1 summarizes the elastic modulus of the body layer material for the laminate samples evaluated in Examples 1–3. Elastic modulus was determined according to ASTM D882-75b using a Sintech I static weighing constant rate-of-grip separation tester, produced by MTS Systems Corp, Eden Prairie, Minn. Elastic modulus for the poly(carbonate) used in the cubes and land layer for all samples was $20.0 \times 10^8$ pascals ($29.1 \times 10^4$ psi).

TABLE 1

| Example Number | Body Layer Material | Elastic Modulus |
|---|---|---|
| 1 | polymethylmethacrylate | $24.4 \times 10^8$ pascal ($35.4 \times 10^4$ psi) |
| 2 | poly(ethylene-co-acrylic acid) | $1.24 \times 10^8$ pascal ($1.80 \times 10^4$ psi) |
| 3 | aliphatic polyester urethane | $0.34 \times 10^8$ pascal ($0.50 \times 10^4$ psi) |

The samples of Examples 1–3 were tested for apparent bending modulus using a Taber™ V-5 stiffness tester, manufactured by Taber Instrument Corp, North Tonawanda, N.Y. Calculations were performed in accordance with ASTM D747-84a. The results are summarized in Table 2.

The samples of Examples 1–3 also were tested for optical path difference (OPD) resulting from bending to a radius of curvature of 9.52 millimeters (0.375 inch). OPD measurements were obtained using a phase shifting Twyman-Green interferometer (manufactured by WYKO Corporation, Tucson, Ariz.) operating at a wavelength of 633 nanometers. OPD provides a means of quantifying the optical distortion of a wave front as it is retroreflected by a cube corner element. Increased optical distortion translates directly into increased spreading of the retroreflected light pattern or divergence profile using fourier optics (for example, as discussed in "The New Physical Optics Notebook: Tutorials in Fourier Optics", Reynolds, DeVelis, Parrent, and Thompson, SPIE Press 1989). Samples or constructions which minimize the OPD wave front distortion for a given deformation are preferred.

Three cube-corner elements were selected on samples representing each of the three examples. The OPD for each of the three cubes, with units of number of wavelengths, was measured both before and after bending about an axis parallel to the primary groove. The OPD results were then differenced to provide an OPD associated only with the bending for each of the three cubes, and the difference results were averaged to produce a final average OPD associated with bending of each of the samples. OPD peak to valley (P-V) and root mean squared (RMS) were used to quantify the wave front distortion. P-V and RMS OPD results are summarized in Table 2.

TABLE 2

| Example | Apparent Bending Modulus | P-V OPD[a] | RMS OPD[a] |
|---|---|---|---|
| 1 | $8.62 \times 10^8$ pascal ($1.25 \times 10^5$ psi) | 1.12 | 0.27 |
| 2 | $1.73 \times 10^8$ pascal ($0.25 \times 10^5$ psi) | 0.72 | 0.14 |
| 3 | $1.24 \times 10^8$ pascal ($0.18 \times 10^5$ psi) | 0.67 | 0.12 |

[a]OPD changes associated with bending to a radius of curvature of 9.52 millimeters (0.375 inch)

The data in Table 2 demonstrates that the use of a relatively low modulus body layer film in combination with high modulus cube materials can produce a significantly more flexible laminate construction. Surprisingly, the resulting flexible laminate also exhibits a much smaller reduction in optical performance for a given deformation when compared to a conventional laminate with a high modulus body layer.

This invention may take on various modifications and alterations without departing from the spirit and scope thereof. Accordingly, it is to be understood that this invention is not to be limited to the above-described but is to be controlled by the limitations set forth in the following claims and any equivalents thereof.

What is claimed is:

1. A retroreflective sheeting, comprising:
   (a) a first layer comprising a first polymeric material having an elastic modulus less than $7 \times 10^8$ pascals, the first layer having a first and second major surface and allowing light that enters the first layer through either the first or the second major surface to pass through the first layer to exit the first layer through the other major surface; and
   (b) a second layer comprising a second polymeric material having an elastic modulus greater than $20 \times 10^8$ pascals, the second layer having a third major surface and having a surface opposite the third major surface in which cube corner elements are formed;
   wherein the third major surface of the second layer attaches directly or through only a thin coating to the second major surface of the first layer;
   wherein the second layer attaches to the first layer through the thin coating, the thin coating promoting adhesion between the first and second layers; and
   wherein the thin coating is a primer.

* * * * *

UNITED STATES PATENT AND TRADEMARK OFFICE
CERTIFICATE OF CORRECTION

PATENT NO. : 7,185,993 B2
APPLICATION NO. : 10/039103
DATED : March 6, 2007
INVENTOR(S) : Kenneth L. Smith It is certified that error appears in the above-identified patent and that said Letters Patent is hereby corrected as shown below:

On page 1, column 1, line 2, delete "RETROFLECTIVE" and insert -- RETROREFLECTIVE" --.

Column 1,
Line 2, delete "RETROFLECTIVE" and insert -- RETROREFLECTIVE --.
Line 37, delete "cube-comer" and insert -- cube-corner --.

Column 2,
Line 57, after "N(H)C(O))" insert -- , --.

Column 4,
Line 21, delete "DR WINGS" and insert -- DRAWINGS --.
Line 56, delete "cube-comer" and insert -- cube-corner --.

Column 6,
Line 7, delete "comer" and insert -- corner --.
Lines 25-26, delete "fluororide);" insert -- fluoride); --.
Line 43, after "radiation." delete "for" and insert -- For --.
Line 49, delete "photoiniator" and insert -- photoinitiator --.
Line 61, after "thereof" insert -- . --.

Column 8,
Line 17, delete "$5 \times 10_8$" and insert -- $5 \times 10^8$ --.

Column 9,
Line 7, after "(ethylene-co-arcylic" delete "acids," and insert -- acid --.
Line 27, delete "Q-thanem™" and insert -- Q-thane™ --.

Column 10,
Line 17, delete "cube-comer" and insert -- cube-corner --.
Line 23, delete "cube-comer" and insert -- cube-corner --.
Line 65, delete "71.1-87.8 C (160-190 F)," and insert -- 71.1-87.8°C (160-190° F), --.

UNITED STATES PATENT AND TRADEMARK OFFICE
CERTIFICATE OF CORRECTION

PATENT NO. : 7,185,993 B2
APPLICATION NO. : 10/039103
DATED : March 6, 2007
INVENTOR(S) : Kenneth L. Smith It is certified that error appears in the above-identified patent and that said Letters Patent is hereby corrected as shown below:

<u>Column 11,</u>
Line 25, after "Sintech" delete "I" and insert -- 1 --.

Signed and Sealed this

Seventeenth Day of July, 2007

JON W. DUDAS
*Director of the United States Patent and Trademark Office*